(12) United States Patent
Lundberg

(10) Patent No.: US 10,165,290 B2
(45) Date of Patent: *Dec. 25, 2018

(54) METHOD FOR ENCODING DIGITAL VIDEO DATA

(71) Applicant: Axis AB, Lund (SE)

(72) Inventor: Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/011,060

(22) Filed: Jun. 18, 2018

(65) Prior Publication Data

US 2018/0302637 A1     Oct. 18, 2018

Related U.S. Application Data

(63) Continuation of application No. 15/013,730, filed on Feb. 2, 2016, now Pat. No. 10,045,037, which is a
(Continued)

(30) Foreign Application Priority Data

Jun. 5, 2013  (EP) ..................... 13170546

(51) Int. Cl.
*H04N 19/137*  (2014.01)
*H04N 19/159*  (2014.01)
(Continued)

(52) U.S. Cl.
CPC ......... *H04N 19/433* (2014.11); *H04N 19/119* (2014.11); *H04N 19/137* (2014.11);
(Continued)

(58) Field of Classification Search
CPC ........... H04N 1/32443; H04N 1/32448; H04N 1/32454; H04N 19/119; H04N 19/137;
(Continued)

(56) References Cited

U.S. PATENT DOCUMENTS 5,696,698 A * 12/1997 Herluison ............... H04N 5/145
345/547
6,067,321 A     5/2000 Lempel
(Continued)

FOREIGN PATENT DOCUMENTS

EP     1 406 211 A2    4/2004
JP     07-303046 A    11/1995
(Continued)

OTHER PUBLICATIONS

European Patent Appln. No. 15 159 0163 Office Action (dated Jul. 15, 2016).
(Continued)

*Primary Examiner* — Nathnael Aynalem
(74) *Attorney, Agent, or Firm* — Volpe and Koenig, P.C.

(57) ABSTRACT

The present invention relates to a method for encoding digital video data corresponding to a sequence of digital source images using a cache memory, each of the digital source images having an equal source image width corresponding to a first number of blocks, the cache memory having a cache width corresponding to a second number of blocks, wherein the second number of blocks is smaller than the first number of blocks.

14 Claims, 2 Drawing Sheets

Related U.S. Application Data continuation of application No. 14/271,076, filed on May 6, 2014, now Pat. No. 9,307,253.

(51) Int. Cl.
| | |
|---|---|
| *H04N 19/172* | (2014.01) |
| *H04N 19/176* | (2014.01) |
| *H04N 19/503* | (2014.01) |
| *H04N 19/433* | (2014.01) |
| *H04N 19/119* | (2014.01) |
| *H04N 19/593* | (2014.01) |
| *H04N 19/156* | (2014.01) |
| *H04N 19/423* | (2014.01) |
| *H04N 19/174* | (2014.01) |
| *H04N 19/52* | (2014.01) |

(52) U.S. Cl.
CPC ......... *H04N 19/156* (2014.11); *H04N 19/159* (2014.11); *H04N 19/172* (2014.11); *H04N 19/174* (2014.11); *H04N 19/176* (2014.11); *H04N 19/423* (2014.11); *H04N 19/503* (2014.11); *H04N 19/52* (2014.11); *H04N 19/593* (2014.11)

(58) Field of Classification Search
CPC .. H04N 19/156; H04N 19/159; H04N 19/172; H04N 19/176; H04N 19/423; H04N 19/426; H04N 19/433; H04N 19/503; H04N 19/593; H04N 21/2183; H04N 21/23106; H04N 21/4435; H04N 19/61
See application file for complete search history.

(56) References Cited

U.S. PATENT DOCUMENTS

| | | | |
|---|---|---|---|
| 8,325,798 | B1 | 12/2012 | Cismas et al. |
| 9,185,437 | B2* | 11/2015 | Bivolarsky .... H04N 21/234363 |
| 2004/0175049 | A1* | 9/2004 | Yamamoto ............. H04N 19/61 |
| | | | 382/236 |
| 2006/0050780 | A1* | 3/2006 | Cooper .................... H04L 1/02 |
| | | | 375/240.01 |
| 2006/0204046 | A1 | 9/2006 | Xia et al. |
| 2008/0285652 | A1 | 11/2008 | Oxman et al. |
| 2009/0245374 | A1 | 10/2009 | Hsu et al. |
| 2009/0310683 | A1 | 12/2009 | Tanaka |
| 2010/0061447 | A1* | 3/2010 | Tu .................. H04N 21/234381 |
| | | | 375/240.03 |
| 2014/0092969 | A1 | 4/2014 | Lee et al. |

FOREIGN PATENT DOCUMENTS

| | | |
|---|---|---|
| JP | 11-220694 A | 8/1999 |
| JP | 2000-115777 A | 4/2000 |
| JP | 2004-266731 A | 9/2004 |
| JP | 2009-055291 A | 3/2009 |
| JP | 2009-232370 A | 10/2009 |
| JP | 2012-227608 A | 11/2012 |
| WO | 2007-112132 A2 | 10/2007 |

OTHER PUBLICATIONS

JP 2014-106269 Office Action (dated Jun. 30, 2015).
EP 13 17 0546 European Search Report (dated Sep. 20, 2013).

* cited by examiner

METHOD FOR ENCODING DIGITAL VIDEO DATA

CROSS REFERENCE TO RELATED APPLICATION

This application is a continuation of U.S. patent application Ser. No. 15/013,730, filed Feb. 2, 2016, which is a continuation of U.S. patent application Ser. No. 14/271,076, filed May 6, 2014, which issued on Apr. 5, 2016 as U.S. Pat. No. 9,307,253, which are incorporated by reference as if fully set forth.

FIELD OF INVENTION

The present invention relates to a method for encoding digital video data corresponding to a sequence of digital source images.

BACKGROUND

Reference cache memories are used to speed up the encoding process when encoding digital video data corresponding to a sequence of digital source images. The reference cache memory comprises at least a part of a reference image. If requested data is contained in the cache (cache hit), this request can be served by simply reading the cache, which is comparatively faster. Otherwise (cache miss), the data has to be recomputed or fetched from its original storage location, which is comparatively slower. Hence, the greater the number of requests that can be served from the cache, the faster the overall system performance becomes. To be cost efficient and to enable an efficient use of data, cache memories are relatively small in terms of memory size.

When using a reference cache memory data is transferred between the original storage location and the cache memory in blocks of data of fixed size, called cache lines, this is usually the smallest amount of data that can be read from the original storage location (typical external DRAM memory). When encoding images the blocks of data corresponds to blocks of pixels also called macro blocks. The data stored in the reference cache memory is hence stored in a structured order making it simple to fetch the image data in the cache memory.

Moreover, the reference cache memory, dedicated to be used when encoding digital video data, is having a cache width corresponding to a maximum source image width being storable in the cache memory.

When encoding digital video data the reference cache memory is arranged to store a preselected number of blocks or macro blocks lines of the reference image. This information is used by a motion estimation unit to find motion in between two frames of the digital video data. The number of blocks or macro blocks lines may vary from e.g. 3 block/macro block lines up to the block/macro block line count that is need for that particular application; a common value is 5 or 7. Moreover, the reference cache memory has to be large enough to store full lines of the blocks/macro blocks of the source image in order to function efficiently. For each new block/macro block line in the source image that will be compressed, the reference cache memory has to be read at least once to perform the motion search. When a source image block/macro block line has been finished the oldest block/macro block line in the reference cache memory may be free to use for a new block/macro block line further down in the reference image.

In order to optimally use the benefits of having a reference cache memory when encoding digital video data corresponding to a sequence of digital source images the source image width, measured in number of blocks of data, must be smaller or equal to the cache width also measured in number of blocks of data.

Thus, encoding source images having a comparatively large source image width, e.g. 4K UHDTV (2160p) (3840×2160 pixels, corresponding to 240×135 macro blocks) or 8K UHDTV (4320p) (7680×4320 pixels, corresponding to 480×270 macro blocks) requires a cache memory having a comparatively large cache width in order to use the cache memory optimally for fast encoding of the digital video data. However, video devices of today do not comprise cache memories of this size.

The cache width of a video encoding device typically follows the source image width of the video images that the video encoding device is encoding to ensure fast encoding of the digital video data. There is however a trend towards larger pixel counts of the source images both due to the fact that image sensors capturing source images have an increasing number of sensor pixels as well as the fact that source images may be composed of image data captured by several individual image sensors. In video encoding devices encoding large source images it may hence not be possible to have a cache memory matching the size of the source image for a number of reasons; large cache memory have relatively high power requirements and are complicated and hence expensive to fabricate, if they are available at all.

Hence, there is a need for optimal usage of existing reference cache memories for speeding up the encoding of comparatively large sized digital video data.

SUMMARY

In view of the above, an objective of the present invention is to find a solution to the above mentioned problem.

In particular, according to a first aspect of the invention a method for encoding digital video data corresponding to a sequence of digital source images using a digital video data encoder comprising a cache memory is provided. Each of the digital source images have an equal source image width corresponding to a first number of blocks and the cache memory have a cache width corresponding to a second number of blocks, wherein the second number of blocks is smaller than the first number of blocks. Hence, the cache width being smaller than the source image width. The method comprises encoding a frame of the digital video data, the frame comprising data corresponding to a first part of a digital source image in the sequence of digital source images, the first part of the digital source image having an image width corresponding to a third number of blocks being smaller than or equal to the second number of blocks such that data pertaining to the first part of the digital source image is storable in the cache memory, and the frame being padded with skip blocks such that an image width of the frame corresponds to the source image width, and encoding a subsequent frame of the digital video data, the subsequent frame comprising data corresponding to a second part of the digital source image, the second part of the digital source image having an image width corresponding to a fourth number of blocks being smaller than or equal to the second number of blocks such that data pertaining to the second part of the digital source image is storable in the cache memory, and the subsequent frame being padded with skip blocks such that the image width of the subsequent frame corresponds to the source image width.

Hence, according to the present invention an encoding method which enables video devices to encode comparably large video images using reference cache memories with a limited cache width is provided. The encoding method according to the present invention enables usage of cache memories having a cache width being at least half the size of the source image width, by dividing the digital source images into more than two parts even smaller cache memories may be used. This enables the cache memory to continue to be comparatively small in terms of memory size saving space on the chip onto which the cache memory is attached. Moreover, a comparatively small cache memory is cheaper to manufacture than comparatively large cache memory. Moreover, the encoding method according to the present invention may be executed using existing standard digital video data encoders, e.g. being able to encode according to any of the ISO/MPEG standards or the ITU-H.26X standards. Furthermore, by using the encoding method according to the present invention encoded digital video data is produced, wherein each frame of the encoded digital video data have an image width corresponding to the image width of the source image width but a frame rate being a multiple of the frame rate of the sequence of digital source images. Such digital video data may be decoded and played back using a standard decoder and video device by setting the frame rate of the video device to the multiple frame rate of the sequence of digital source images and setting the image width to the source image width. This means that the generated digital video stream will be fully compatible with existing decoding standards and yet allowing the cache to be comparably small in terms of memory size.

The frame and subsequent frame of the digital video data may be encoded as INTER-frames.

The method may further comprise encoding a preceding frame of the digital video data, the preceding frame corresponding to an additional digital source image in the sequence of digital source images, wherein the preceding frame is encoded as an INTRA-frame. When encoding an INTRA frame, no search is needed, thus the cache is not used. INTRA frames are encoded according to the standard.

The method may further comprise providing an additional frame of the digital video data, the additional frame being an INTER-frame comprising only skip blocks. The additional frame of the digital video data is introduced so that a constant frame rate may be obtained. Hence after the INTRA frame there will be some totally empty frames (skip only) then the encoding of the "real" INTER frames will start.

The additional frame may be subsequent the preceding frame.

The frame and the subsequent frame may be subsequent the additional frame.

The first and second parts of the digital source image may not overlap. This is optimal since the same data pertaining to the digital source image only need to be encoded once.

The image width of the first and second parts of the digital source image may be equal.

The digital source images of the sequence of digital source images may comprise data acquired by a plurality of image sensors and wherein the first part of the digital source image corresponds to image data acquired by a first image sensor and the second part of the digital source image corresponds to image data acquired by another image sensor. The image data from different sensors may be cropped, stretched, shrunk, warped, processed etc automatically or by calibration to align and even out any overlap or imperfectness due to differences in the physical sensor placements, optical effects etc. before encoding.

The source image may be divided into multiple parts where each part (horizontally) has a number of blocks that is small enough to fit in the reference cache. Hence, the source image width may be a multiple of the cache width.

The method may further comprise sending side information pertaining to the encoded digital video data to a decoder arranged to decode the encoded digital video data, wherein the side information comprises at least one of a frame rate of the encoded video data, a frame rate of the sequence of digital source images, the cache width and the source image width to a decoder arranged to decode the encoded digital video data. Using this information the decoder may be optimized for displaying the encoded video data in an optimal manner. The sending of the side information to the decoder may be made over a side channel, or by special messages in the bit stream or by manual configuration or pre configuration. By sending side information according to the above a ratio between the frame rate of the encoded video data and the frame rate of the sequence of digital source images may be found. In the decoder the ratio between the frame rates may be used to set which frames of the decoded video data that shall be displayed. If for example 4 times the framer rate of the sequence of digital source images was used to encode the digital video sequence the decoder may choose not to display new information until all four parts of the original sequence has been decoded. By using this alternative method of displaying the decoded encoded video data the frame rate of the displayed video data corresponds with the frame rate of the sequence of digital source images.

According to a second aspect of the invention a computer-readable recording medium having recorded thereon a program for implementing the above method when executed on a device having processing capabilities is provided.

It is noted that the invention relates to all possible combinations of features recited in the claims.

BRIEF DESCRIPTION OF THE DRAWINGS

These and other aspects of the present invention will now be described in more detail, with reference to appended drawings showing embodiments of the invention. The figures should not be considered limiting the invention to the specific embodiment; instead they are used for explaining and understanding the invention.

DETAILED DESCRIPTION OF THE PREFERRED EMBODIMENTS

Figure 1:
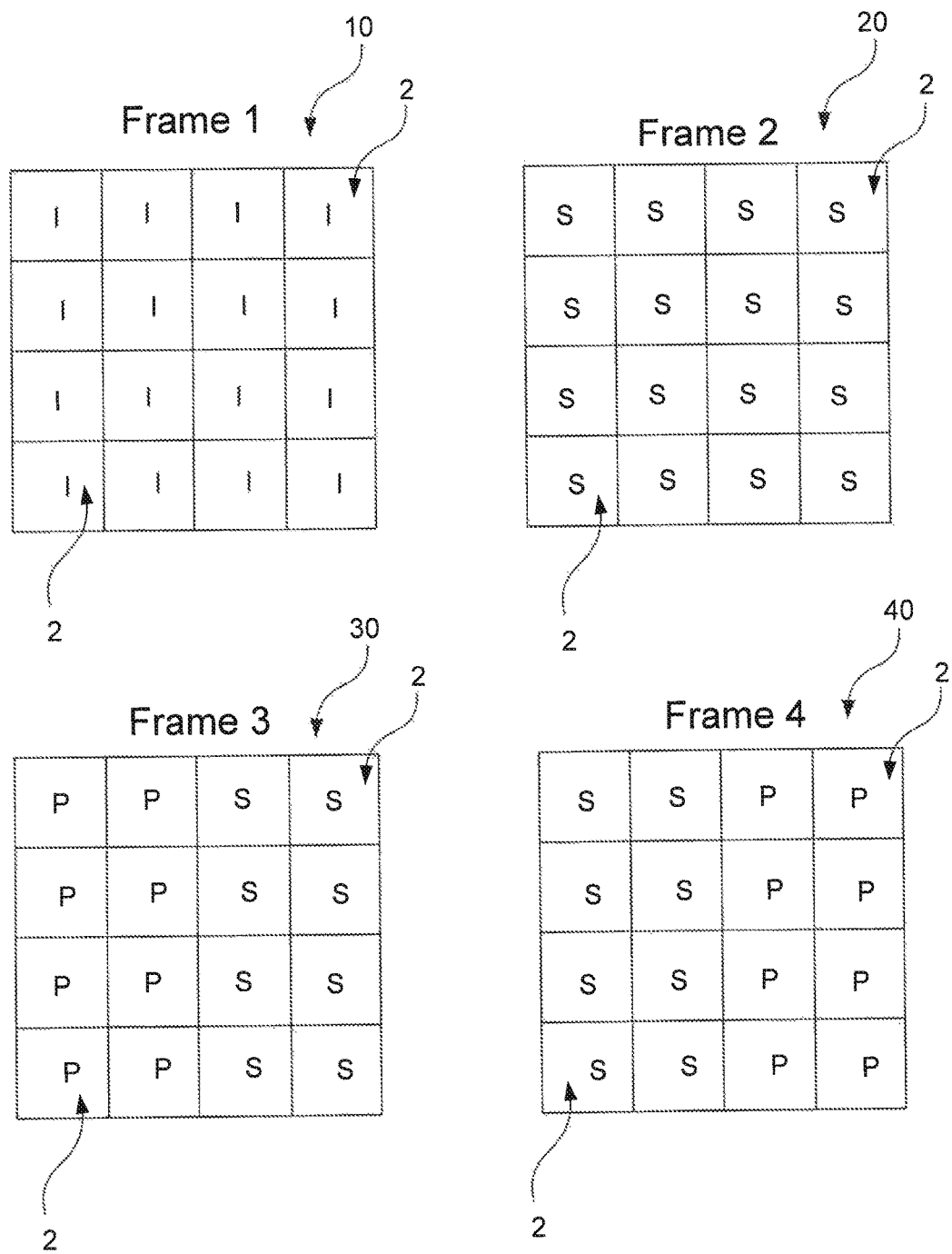
FIG. 1 is a schematic view of a sequence of four frames of encoded digital video data according to the present invention.

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the video coding standards of the ISO/MPEG family (MPEG-1, MPEG-2, MPEG-4) and to the video recommendations of the ITU-H.26X family (H.261, H.263 and extensions, H.264 and HEVC, the upcoming h.265 standard). However, the same techniques can easily be applied to other types of video coding standards, e.g. Microsoft codecs belonging to the WMV-family, On2 codecs (e.g. VP6, VP6-E, VP6-S, VP7 or VP8) or WebM.

In modern digital video coding systems, two main modes are used to compress a video frame of a video stream of video frames: the INTRA-mode and the INTER-mode. In the INTRA-mode, the luminance and chrominance channels are encoded by exploiting the spatial redundancy of the pixels in a given channel of a single frame via prediction, transform and entropy coding. The INTER-mode, exploiting the temporal redundancy between separate frames, relies on a motion-compensation prediction technique that predicts parts of a frame from one (or more) previously decoded frame(s) by encoding the motion in pixels from one frame to the other for selected blocks. In INTER mode the luminance and chrominance channels does not have any motion predictions.

Usually, a frame to be encoded is partitioned into minimum coding units (block, macro blocks etc) which is being compressed and encoded individually. In INTER mode each of the blocks are assigned one or several motion vectors. A prediction of the frame is constructed by displacing pixel blocks from past and/or future frame(s) according to the set of motion vectors. Finally, the difference, called the residual signal, between the frame to be encoded is transformed in a similar way to the INTRA-mode and together with its motion-compensated prediction is entropy encoded to form a bit stream.

Moreover, in INTER-mode skip blocks may be used. A skip block is coded without sending residual error or motion vectors. The encoder will only record that it is a skip block. The decoder will deduce the motion vector of a skip block from other blocks already decoded. According to this invention the motion vector of a skip block is preferably deduced from a block of a proceeding frame of the digital video data.

Video frames being encoded according to the INTRA-mode, without any reference to any past or future frame, are called I-frames. Video frames being encoded according to the INTER-mode are themselves either mono-directionally predicted frames, called P-frames and encoded with reference to a past or future frame which is an INTRA- or INTER-frame, or bi-directionally predicted frames, called B-frames and encoded with reference to two or more past or future reference frames. Both P-frames and B frames may include I-blocks which encodes new data not found anywhere in earlier frames, but usually they are rare.

INTRA-frames comprise either scene change frames, placed at the beginning of a new group of frames corresponding to a scene change, where no temporal redundancy is available, or refresh frames, placed in other locations where some temporal redundancy is available. I frames are usually inserted at regular or irregular interval to have refresh-point for new stream encoders or as a recovery point for transmission errors.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Encoding video images of a comparably large size, e.g. 4K or 8K video images, requires more cache memory than what is typically available in video devices today. This invention addresses this problem with an encoding method which enables video devices to encode comparably large video images using cache memories with a limited cache width.

As mentioned the present invention may e.g. be used for encoding 4K video images but the method could of course also be used for other applications experiencing a similar problem with a source image having a larger image width (in number of pixels or blocks) than the cache memory can handle. An example of this is a camera having several image sensors and fusing images from these image sensors to a composite image that is then encoded.

For example, in the case of encoding 4K video images it will be possible to use a video device having a digital video data encoder with a cache memory only capable of encoding 2K video (50% reference cache size). The source video is hence 3840×2160 pixels and the cache width is limited to 1920 pixels in this example.

In FIG. 1 an example of a sequence of four frames of encoded digital video data corresponding to a sequence of digital source images according to the present invention is illustrated. The frames of the encoded digital video data are divided into a plurality of blocks 2. In the in FIG. 1 shown example each frame of the encoded digital video data is divided into 16 blocks. However, each frame may be divided into an arbitrary number of blocks. Each of the digital source images used for encoding the digital video data have an equal source image width corresponding to a first number of blocks. The source images used to encode the digital video data of FIG. 1 have an image width corresponding to four blocks. It is however realized that source images having an image width corresponding to any number of blocks (except a width of one block) may be used. The digital video data encoder used to encode the digital video data has a cache memory with a cache width corresponding to a second number of blocks, in the example illustrated in FIG. 1 the cache width corresponds to two blocks. The second number of blocks is smaller than the first number of blocks. Hence, the cache width is smaller than the source image width.

An INTRA-frame 10, being a first frame of the digital video data, is encoded using an INTRA-encoding mode. The INTRA-frame 10 corresponds to a first frame of the sequence of digital source images. The cache memory is not used for encoding INTRA-frames. The INTRA-frame 10 has an image width corresponding to the source image width. Hence, in the example shown in FIG. 1 the image width of the INTRA-frame 10 is 4 blocks wide.

For each INTRA-frame at least one additional frame 20 of the digital video data is encoded using an INTER-encoding mode. The at least one additional frame 20 have an image width corresponding to the source image width. The additional frame 20 of the digital video data is encoded as a number of skip blocks. The additional frame 20 of the digital video data does not correspond to any of the frames of the sequence of digital source images. The amount of additional frames 20 depend on the number of parts the subsequent frames of the sequence of digital source images are divided into, see below regarding the division of the subsequent frames into parts. The amount of additional frames 20 are equal to the number of parts into which the subsequent frames of the sequence of digital source images are divided minus one. For example, if the subsequent frames are divided into four parts the numbers of additional frames are three. In the example illustrated in FIG. 1 the amount of additional frames is one since the subsequent frames of the sequence of digital source images are divided into two parts. The additional frame 20 of the digital video data is introduced so that a constant frame rate is obtained.

To encode a subsequent frame of the sequence of digital source images, being subsequent the first frame of the sequence of digital source images, INTER-encoding mode is used. The subsequent frame is divided into parts, in FIG. 1 two parts are used however it is realized that the number of parts may vary depending on the cache width and the width of the digital source images. The parts of the subsequent frame of the digital source image have an image width being smaller than or equal to the cache width such that data pertaining to the parts of the digital source image is storable in the cache memory. Thereafter, a frame 30, corresponding to the third frame of the digital video data of FIG. 1 is encoded using INTER-encoding mode. The frame 30 comprises a first region comprising data corresponding to a first part of the subsequent digital source image and a region padded with skip blocks. In FIG. 1 the blocks of the first region being marked with P and the blocks of the region padded with skip blocks being marked with S. After that, a subsequent frame 40, corresponding to the fourth frame of the digital video data of FIG. 1, comprising a first region padded with skip blocks, the blocks of the first region being marked with S in FIG. 1, and another region comprising data corresponding to a second part of the subsequent digital source image, the blocks of the another region being marked with P in FIG. 1, is encoded using INTER-encoding mode. The image width of the frame 30 and subsequent frame 40 corresponds to the source image width. Hence, in the example of FIG. 1 the subsequent frame of the sequence of digital source images is encoded using two separate INTER-frames.

The size of the image parts described in the example may be altered to fit specific requirements of an encoder used for encoding the digital video data and a decoder used for decoding the digital video data. For example, if the cache width is smaller than half of the source image width, the source image may be divided in four parts having the same height as the source image and an image width being a fourth of the source image width.

The encoding method according to the present invention may be executed using existing standard digital video data encoders being able to encode according to any of the ISO/MPEG standards or the ITU-H.26X standards.

By using the encoding method according to the present invention encoded digital video data is produced, wherein each frame of the encoded digital video data have an image width corresponding to the image width of the source image width but a frame rate being a multiple of the frame rate of the sequence of digital source images. Such digital video data may be decoded and played back using a standard decoder and video device by setting the frame rate of the video device to the multiple frame rate of the sequence of digital source images and setting the image width to the source image width.

Hence, according to the example illustrated in FIG. 1, the digital video data encoder sends a message to the receiver of the digital video data that the video has full size (in this case having an image width of four blocks) but two times higher frame rate than the frame rate of the sequence of digital source images.

Alternatively, by using the encoding method of the present invention it is possible to inform the decoder arranged to decode the encoded digital video data about the encoding method which enables the decoder to display the decoded encoded video data in an optimal manner. For example, by sending information pertaining to a frame rate of the encoded video data and a frame rate of the sequence of digital source images or information pertaining to the cache width and the source image width a ratio between the two frame rates may be found. In the decoder the ratio between the frame rates may be used to set which frames of the decoded video data that shall be displayed. If for example 4 times the frame rate of the sequence of digital source images was used to encode the digital video sequence the decoder may choose not to display new information until all four parts of the original sequence has been decoded. By using this alternative method of displaying the decoded encoded video data the frame rate of the displayed video data corresponds with the frame rate of the sequence of digital source images.

In the example of FIG. 1 two times the frame rate of the sequence of digital source images was used to encode the digital video sequence the decoder. Hence, only every second frame of the decoded encoded video data needs to be displayed. More precisely, in the example of FIG. 1 the additional frame 20 comprising only skip blocks and the subsequent frame 40 being the last INTER-frame of the subsequent frame of the sequence of digital source images shall be displayed. The skip blocks imply that the image information from the earlier frame will be displayed.

Figure 2:
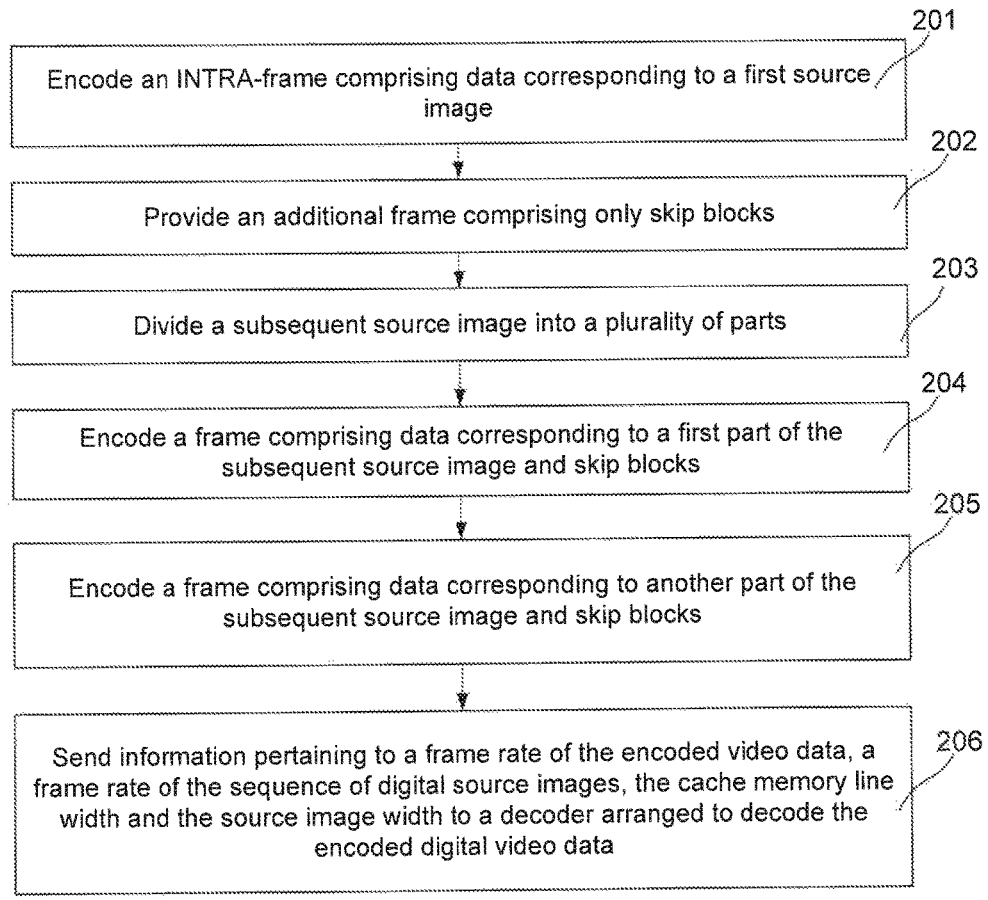
FIG. 2 is a schematic flow chart, showing a method for encoding digital video data according to the present invention.

With reference to FIG. 2 the method according to the present invention for encoding digital video data corresponding to a sequence of digital source images will be discussed in more detail. Each of the digital source images have an equal source image width corresponding to a first number of blocks. The method is performed using a digital video data encoder comprising a cache memory, the cache memory have a cache width corresponding to a second number of blocks, wherein the second number of blocks is smaller than the first number of blocks. Hence, the cache width is smaller than the source image width. The method comprising the following steps:

Encoding, step 201, an INTRA-frame 10 comprising data corresponding to a first image of the sequence of digital source images.

Providing, step 202, at least one additional frame 20 being an INTER-frame comprising only skip blocks.

Dividing, step 203, a digital source image of the sequence of digital source images being subsequent the first source image of the sequence of digital source images into a plurality of parts. Each part of the subsequent digital source image having an image width being smaller than or equal to the cache width such that data pertaining to each part of the digital source image is storable in the cache memory. Preferably, the parts of the subsequent source image are equal in image width.

Encoding, step 204, a frame 30 of the digital video data, the frame 30 comprising data corresponding to a first part of the subsequent digital source image and skip blocks such that an image width of the first frame corresponds to the source image width. The frame 30 of the digital video data being encoded using INTER-mode.

Encoding, step 205, a subsequent frame 40 of the digital video data, the subsequent frame 40 comprising data corresponding to another part of the subsequent digital source image and skip blocks such that an image width of the second frame corresponds to the source image width. The subsequent frame 40 of the digital video data being encoded using INTER-mode.

Sending, step 206, side information pertaining to at least one of a frame rate of the encoded video data, a frame rate of the sequence of digital source images, the cache width and the source image width to a decoder arranged to decode the encoded digital video data. The sending of the side information to the decoder may be made over a side channel, or by special messages in the bit stream or by manual configuration or pre configuration.

Decoding can be made without using the side information at all. Hence, the decoder is functioning as normal when decoding an encoded digital video sequence. If decoding is made without using the side information at all the step 206 of sending the side information to the decoder may be opt out.

Alternatively, the side information may be used to adjust the display time for the frames of the decoded digital video sequence. If so, the side information may be used adjust the display time of the decoded digital video sequence to match the frame rate of the sequence of digital source images. If for example 4 times the frame rate of the sequence of digital source images was used to encode the digital video sequence the decoder may choose not to display new information until all four parts of the original sequence has been decoded.

In order to inform the decoder of how many frames are used to encode one frame of the sequence of digital source images information pertaining to the frame rate of the encoded video data, the frame rate of the sequence of digital source images or a ratio between these frame rates may be used. Alternatively, the cache width and the source image width or a ratio between these two widths may be used.

The person skilled in the art realizes that the present invention by no means is limited to the preferred embodiments described above. On the contrary, many modifications and variations are possible within the scope of the appended claims.

For example, it is realized that the encoding of the digital video data corresponding to a sequence of digital source images may be performed by any standard digital video encoder being arranged for encoding according to video coding standards of the ISO/MPEG family (MPEG-1, MPEG-2, MPEG-4), the video recommendations of the ITU-H.26X family (H.261, H.263 and extensions, H.264 and HEVC, the upcoming h.265 standard). However, the same techniques can easily be applied to other types of video coding standards, e.g. Microsoft codecs belonging to the WMV-family, On2 codecs (e.g. VP6, VP6-E, VP6-S, VP7 or VP8) or WebM.

The encoder may have a processor having processing capabilities for executing a program for implementing the method for encoding the digital video data according to the present invention.

The encoder may have hardware components for performing the steps of the method for encoding the digital video data according to the present invention.

The encoder may have both hardware components for performing some of the steps of the method for encoding the digital video data according to the present invention and a processor having processing capabilities for executing a program for implementing some of the steps of the method for encoding the digital video data according to the present invention.

The digital video encoder may be located in a digital video camera being arranged for capturing the sequence of digital source images. Alternatively, the digital video encoder may be located in a video encoding device arranged to encode digital source images from external video capturing devices.

Additionally, variations to the disclosed embodiments can be understood and effected by the skilled person in practicing the claimed invention, from a study of the drawings, the disclosure, and the appended claims. Moreover, in the drawings and specification, there have been disclosed preferred embodiments and examples of the invention and, although specific terms are employed, they are used in a generic and descriptive sense only and not for the purpose of limitation, the scope of the invention being set forth in the following claims. In the claims, the word "comprising" does not exclude other elements or steps, and the indefinite article "a" or "an" does not exclude a plurality.

What is claimed is:

1. A method for encoding digital video data using a digital video data encoder, the method comprising:

dividing a digital source image of a sequence of digital source images into a plurality of parts, each part having an image width smaller than or equal to a cache width of a cache memory of the digital video encoder, each of the digital source images having a source image width corresponding to a first number of blocks;

encoding a first frame of the digital video data, the first frame comprising data corresponding to a first part of the digital source image in the sequence of digital source images, the first part of the digital source image having an image width being smaller than the source image width; and encoding a second frame of the digital video data, the second frame comprising data corresponding to a second part of the digital source image, the second part of the digital source image having an image width being smaller than the source image width, wherein the first frame and the second frame are encoded as INTER-frames.

2. The method according to claim 1, wherein the first part of the digital source image and the second part of the digital source image are first and second parts of the same digital source image, wherein the first and second parts are different parts.

3. The method according to claim 1, wherein the first and second parts of the digital source image do not overlap.

4. The method according to claim 1, wherein the image widths of the first and second parts are equal.

5. The method according to claim 1, wherein the cache memory has a cache width corresponding to a second number of blocks, wherein the second number of blocks is smaller than the first number of blocks, wherein the first part of the digital source image having an image width corresponding to a third number of blocks being smaller than or equal to the second number of blocks such that data pertaining to the first part of the digital source image is storable in the cache memory, wherein the second part of the digital source image having an image width corresponding to a fourth number of blocks being smaller than or equal to the second number of blocks such that data pertaining to the second part of the digital source image is storable in the cache memory.

6. The method according to claim 5, wherein the source image width is a multiple of the cache width.

7. The method according to claim 1, further comprising sending side information pertaining to the encoded digital video data to a decoder arranged to decode the encoded digital video data, wherein the side information comprises at least one of a frame rate of the encoded video data, a frame rate of the sequence of digital source images, the cache width and the source image width.

8. The method according to claim 1, further comprising sending side information of how many frames are used to encode one frame of the sequence of digital source frames.

9. An encoder arranged to:

divide a digital source image of a sequence of digital source images into a plurality of parts, each part having an image width smaller than or equal to the cache width of a cache memory of the digital video encoder, each of the digital source images having a source image width corresponding to a first number of blocks;

encode a first frame of the digital video data, the first frame comprising data corresponding to a first part of the digital source image in the sequence of digital source images, the first part of the digital source image having an image width being smaller than the source image width; and encode a second frame of the digital video data, the second frame comprising data corresponding to a second part of the digital source image, the second part of the digital source image having an image width being smaller than the source image width, wherein the first frame and the second frame are encoded as INTER-frames.

10. A system comprising:

a video capturing device arranged to capture a sequence of digital source images; and an encoder arranged to:

divide a digital source image of the sequence of digital source images into a plurality of parts, each part having an image width smaller than or equal to the cache width of a cache memory of the encoder, each of the digital source images having a source image width corresponding to a first number of blocks;

encode a first frame of digital video data, the first frame comprising data corresponding to a first part of the digital source image in the sequence of digital source images, the first part of the digital source image having an image width being smaller than the source image width; and encode a second frame of digital video data, the second frame comprising data corresponding to a second part of the digital source image, the second part of the digital source image having an image width being smaller than the source image width, wherein the first frame and the second frame are encoded as INTER-frames.

11. The system according to claim 10, wherein the encoder is located in the video capturing device.

12. The system according to claim 10, wherein the encoder is located in a video encoding device being separate from the video capturing device.

13. A system comprising:

an encoder arranged to:

divide a digital source image of the sequence of digital source images into a plurality of parts, each part having an image width smaller than or equal to a cache width of a cache memory of the encoder, each of the digital source images having a source image width corresponding to a first number of blocks;

encode a first frame of digital video data, the first frame comprising data corresponding to a first part of the digital source image in the sequence of digital source images, the first part of the digital source image having an image width being smaller than the source image width;

encode a second frame of digital video data, the second frame comprising data corresponding to a second part of the digital source image, the second part of the digital source image having an image width being smaller than the source image width, wherein the first frame and the second frame are encoded as INTER-frames; and send the encoded digital video data to a decoder; and a decoder is arranged to decode and display the received digital video data.

14. The system according to claim 13, wherein the encoder is further arranged to send side information pertaining to the encoded digital video data to a decoder arranged to decode the encoded digital video data, wherein the side information comprises at least one of a frame rate of the encoded video data, a frame rate of the sequence of digital source images, the cache width, the source image width, and the number of frames that are used to encode one frame of the sequence of digital source frames; and wherein the decoder is further arranged to display the decoded digital video data based on the received side information.

* * * * *